C. L. TATE.
LIQUID MEASURE.
APPLICATION FILED JAN. 22, 1908.
898,701.
Patented Sept. 15, 1908.
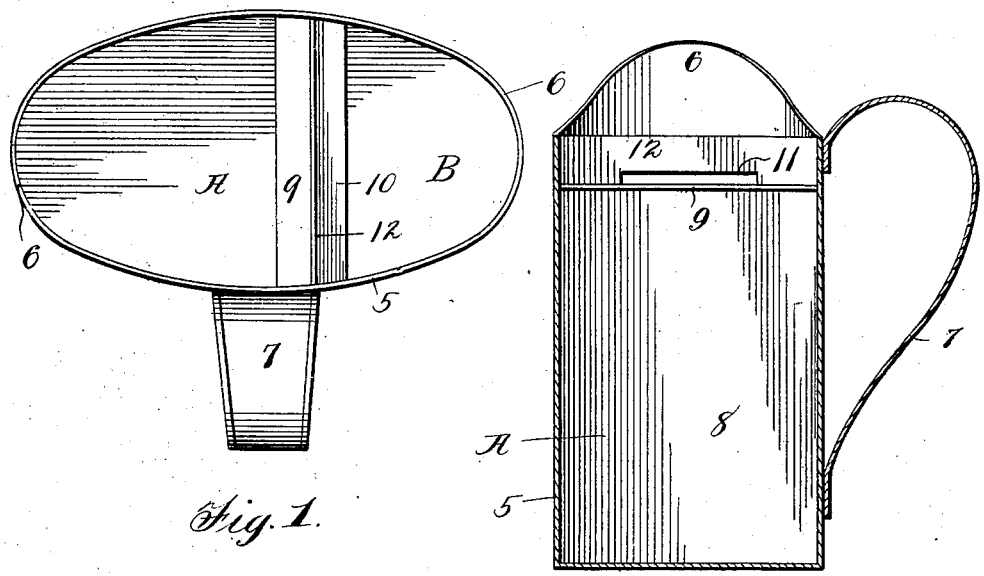
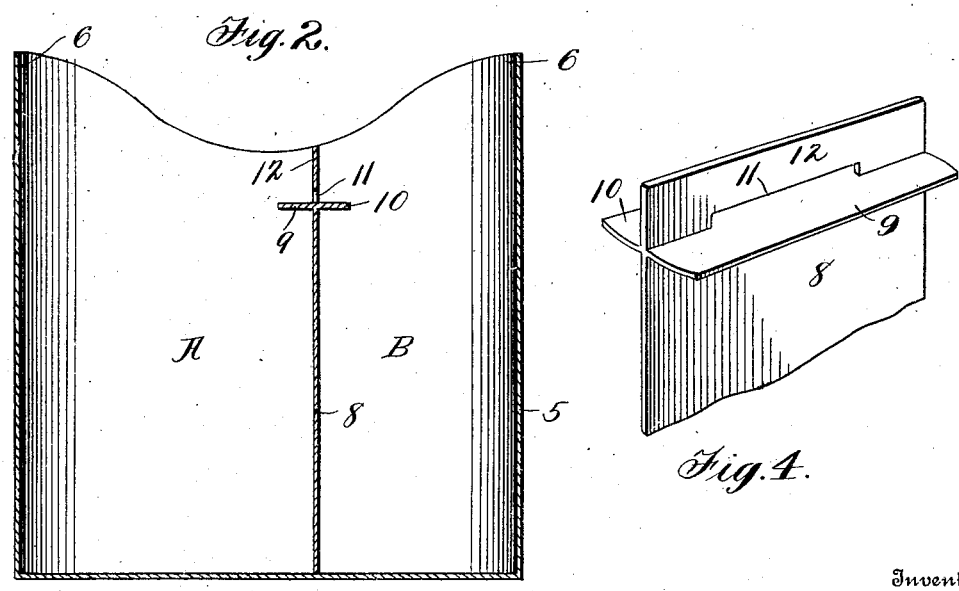
Witnesses
R. Campbell
A. Murray
Inventor
Curtis L. Tate.
By Shephird & Campbell
Attorney

UNITED STATES PATENT OFFICE.

CURTIS L. TATE, OF CONNERSVILLE, INDIANA.

LIQUID-MEASURE.

No. 898,701.  Specification of Letters Patent.  Patented Sept. 15, 1908.

Application filed January 22, 1908. Serial No. 412,129.

*To all whom it may concern:*

Be it known that I, CURTIS L. TATE, a citizen of the United States, residing at Connersville, in the county of Fayette and State of Indiana, have invented certain new and useful Improvements in Liquid-Measures, of which the following is a specification.

My invention relates to liquid measures and has for its object the provision of a device of this character constructed in such manner that the measure may be filled to a desired point without the liability of the liquid being measured, overflowing from the measure and wasting.

A further object of the invention is the provision of a device of the character described, constructed in such manner that varying quantities of liquid may be measured therein.

Further objects and advantages of the invention will be set forth in the detailed description which now follows:

In the accompanying drawing: Figure 1 is a plan view of a liquid measure constructed in accordance with the invention. Fig. 2 is a longitudinal, vertical section through said measure: Fig. 3 is a transverse vertical section of said measure and, Fig. 4 is a detailed perspective view of a portion of a dividing wall hereinafter described.

Like numerals designate corresponding parts in all of the figures of the drawing.

Referring to the drawing, the numeral 5 designates the body portion of the measure. This body is substantially elliptical in cross section and its ends are extended upwardly to form spouts 6. A handle 7 is secured to one side of the measure and provides means for tilting said measure either to the right or to the left in Fig. 2. A dividing wall 8 divides the body 5 into the compartments A and B. This dividing wall is not centrally located but is so disposed that the compartments A and B are of different capacities. I preferably construct the measure of such proportions that the compartment A will measure one quart and the compartment B will measure one pint, though it is of course to be understood that the invention is not limited in this respect and that the compartments may be of greater capacities than those designated or of less capacities than those designated. Horizontally disposed lips 9 and 10 are carried by the wall 8 and extend from one side of the body 5 to the other. An elongated opening 11 is formed through the dividing wall 8 immediately above the lips 9 and 10 and serves a purpose which will be hereinafter described. That portion of the wall 8 which lies above the lips 9 and 10 forms a foam retaining wall 12.

The measure herein shown and described is particularly designed for the use of milk men, though its use is not limited to the measuring of milk for it is equally well adapted to measure any other liquid. When measuring milk in a measure of the ordinary construction, a portion of the milk is often wasted because of the fact that the milk foams to such a degree that the solid or body portion of the milk is hidden from view and the milk man is only apprised of the fact that the measure is filled, when the milk overflows.

The present invention is designed to obviate the foregoing difficulty and its operation is as follows: Assuming that it is desired to measure one quart of milk in the compartment A, the milk is poured into this compartment until it reaches the upper surface of the lips 9. The compartment at this time contains one quart of milk and any additional milk poured into the compartment A will overflow into the compartment B through the opening 11. When the measure is tilted to the left in Fig. 2 to pour the milk contained in the compartment A from the left hand spout 6, any milk which had previously entered the compartment B through the opening 11 would be caught and retained by the lip 10. The only milk therefore, which would be poured into the pitcher or other receptacle of the customer would be the quart of milk measured in the compartment A.

Since, as has been before stated, milk foams to such a degree as to conceal the solid body thereof from view, the present structure provides efficient means for indicating when the measure is full. The foam on top of the milk is prevented by the wall 12 from passing into the compartment B and yet, when the solid body of milk reaches the upper surface of the lip 9, the trickling of the milk through the opening 11 immediately indicates when the measure is full. In like manner, when a pint of milk is to be measured in the compartment B, any overflow therefrom enters the compartment A and is retained therein by the lip 9 when the measure is tilted to pour the milk from the compartment B.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. A liquid measure comprising a body portion, a transverse wall dividing said body portion into two compartments and an overflow retaining lip located upon each side of said dividing wall below the top of the body portion.

2. A liquid measure comprising a body portion, a transverse wall dividing said body portion into two compartments and overflow retaining lips carried by said transverse wall, and located upon opposite sides thereof, there being an opening formed through said dividing wall above said retaining lips.

3. A liquid measure comprising a body portion, the ends of which are upwardly extended to form spouts and a dividing wall which divides said body portion into a plurality of compartments of varying capacities and overflow retaining lips carried by said dividing wall.

4. A liquid measure comprising a body portion, the ends of which are upwardly extended to form spouts and a dividing wall which divides said body portion into a plurality of compartments of varying capacities, and overflow retaining lips carried by said dividing wall, there being an opening formed through said dividing wall above said overflow retaining lips.

In testimony whereof I affix my signature, in presence of two witnesses.

CURTIS L. TATE.

Witnesses:
 ALLEN WILES,
 BERTHA SANDERS.